United States Patent
Wiberg

(10) Patent No.: US 12,049,332 B2
(45) Date of Patent: Jul. 30, 2024

(54) PROPELLER FOR AN AIRCRAFT

(71) Applicant: KATLA AERO AB, Brottby (SE)

(72) Inventor: Gustav Wiberg, Stockholm (SE)

(73) Assignee: KATLA AERO AB, Brottby (SE)

( * ) Notice: Subject to any disclaimer, the term of this patent is extended or adjusted under 35 U.S.C. 154(b) by 0 days.

(21) Appl. No.: 17/766,444

(22) PCT Filed: Apr. 27, 2021

(86) PCT No.: PCT/EP2021/060905
§ 371 (c)(1),
(2) Date: Apr. 4, 2022

(87) PCT Pub. No.: WO2021/219588
PCT Pub. Date: Nov. 4, 2021

(65) Prior Publication Data
US 2024/0051687 A1 Feb. 15, 2024

(30) Foreign Application Priority Data

Apr. 27, 2020 (SE) .................................... 2050476-7

(51) Int. Cl.
*B64U 10/16* (2023.01)
*B64U 30/21* (2023.01)

(52) U.S. Cl.
CPC ............ *B64U 10/16* (2023.01); *B64U 30/21* (2023.01)

(58) Field of Classification Search
CPC ..... B64C 27/30; B64C 27/50; B64C 29/0025; B64C 29/0033; B64C 11/28; B64U 30/293
See application file for complete search history.

(56) References Cited

U.S. PATENT DOCUMENTS 2,008,843 A   7/1935   Smith
3,811,642 A *  5/1974   Prather .................. B64C 31/04
                                                    244/65

(Continued)

FOREIGN PATENT DOCUMENTS

CN      204688404 U    10/2015
EP      3 459 843 A1    3/2019

OTHER PUBLICATIONS

International Search Report for PCT/EP2021/060905 mailed on Aug. 2, 2021.

(Continued)

*Primary Examiner* — Joshua J Michener
*Assistant Examiner* — Michael B. Kreiner
(74) *Attorney, Agent, or Firm* — Birch, Stewart, Kolasch & Birch, LLP

(57) ABSTRACT

A propeller for an aircraft includes at least two blades, arranged about a central hub, which is coupled to at least one motor, driven by a power source. At least one blade is attached to at least one sleeve member, configured for being in an outer sliding connection to a first cylindrical element of the hub. An inner surface of each of the at least one sleeve member includes at least one projecting element, configured to be in a sliding connection with a corresponding at least one first recessed guide path, arranged in an outer surface of the first cylindrical element. Each of the at least one first recessed guide path circles at least partly around the first cylindrical element from a first position to a second position. Each of the at least one sleeve member positions its blade in an operational position when its, at least one, projecting element is positioned in its corresponding first position in its designated first recessed guide path of the first cylindrical element. Each of the at least one sleeve member positions its blade in a storage position when its, at least one, projecting element is positioned in its corresponding second position in (Continued)

its designated first recessed guide path of the first cylindrical element. A rotation of the first cylindrical element moves each of the at least one sleeve member thereabout along their first recessed guide path. An arrangement includes the propeller and a compartment configured to accommodate the propeller. An aircraft includes at least one wing and at least one propeller.

17 Claims, 14 Drawing Sheets

(56) References Cited

U.S. PATENT DOCUMENTS

| | | | | |
|---|---|---|---|---|
| 3,995,793 | A * | 12/1976 | Wing | B64C 27/22 |
| | | | | 244/17.23 |
| 6,622,962 | B1 * | 9/2003 | White | B64C 27/26 |
| | | | | 244/12.3 |
| 8,089,034 | B2 * | 1/2012 | Hammerquist | F42B 10/14 |
| | | | | 244/3.28 |
| 8,376,264 | B1 * | 2/2013 | Hong | B64C 27/10 |
| | | | | 244/17.23 |
| 9,284,962 | B2 * | 3/2016 | Long | B64C 11/16 |
| 9,540,103 | B2 * | 1/2017 | Long | B64C 27/32 |
| 9,896,197 | B2 * | 2/2018 | Vetter | B64U 10/20 |
| 10,155,585 | B2 * | 12/2018 | Johannesson | B64U 30/293 |
| 10,392,104 | B1 * | 8/2019 | Urban | B64C 39/024 |
| 10,494,088 | B1 * | 12/2019 | Coralic | B64C 27/10 |
| 10,669,869 | B1 * | 6/2020 | Urban | B64C 11/28 |
| 10,689,103 | B2 * | 6/2020 | Holik | B64U 30/292 |
| 10,780,975 | B2 * | 9/2020 | Benson | B64C 11/28 |
| 10,843,795 | B2 * | 11/2020 | Prager | B64C 27/50 |
| 10,994,829 | B2 * | 5/2021 | Duffy | B64C 29/0025 |
| 11,254,425 | B2 * | 2/2022 | Thalheimer | B64C 27/467 |
| 11,465,737 | B1 * | 10/2022 | McDonald | B64C 29/0025 |
| 11,603,192 | B2 * | 3/2023 | Jung | B64C 27/50 |
| 2014/0084114 | A1 * | 3/2014 | Valentin | B64C 27/28 |
| | | | | 244/7 R |
| 2019/0092461 | A1 * | 3/2019 | Duffy | B64C 11/28 |
| 2019/0382106 | A1 * | 12/2019 | Prager | B64C 39/024 |
| 2020/0031462 | A1 * | 1/2020 | Svoboda, Jr. | B64C 29/0025 |

OTHER PUBLICATIONS

Written Opinion of the International Searching Authority for PCT/EP2021/060905 mailed on Aug. 2, 2021.

* cited by examiner

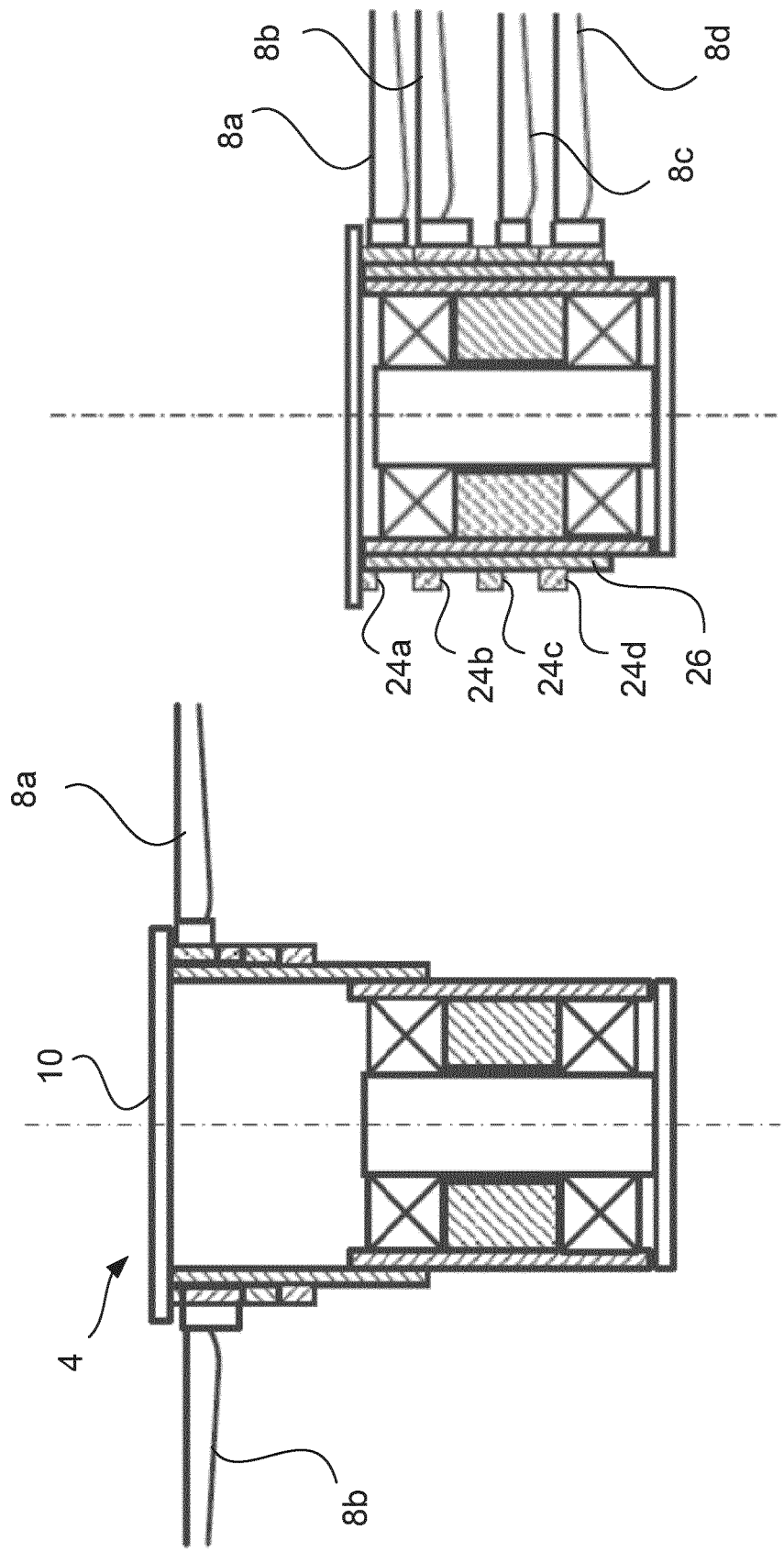

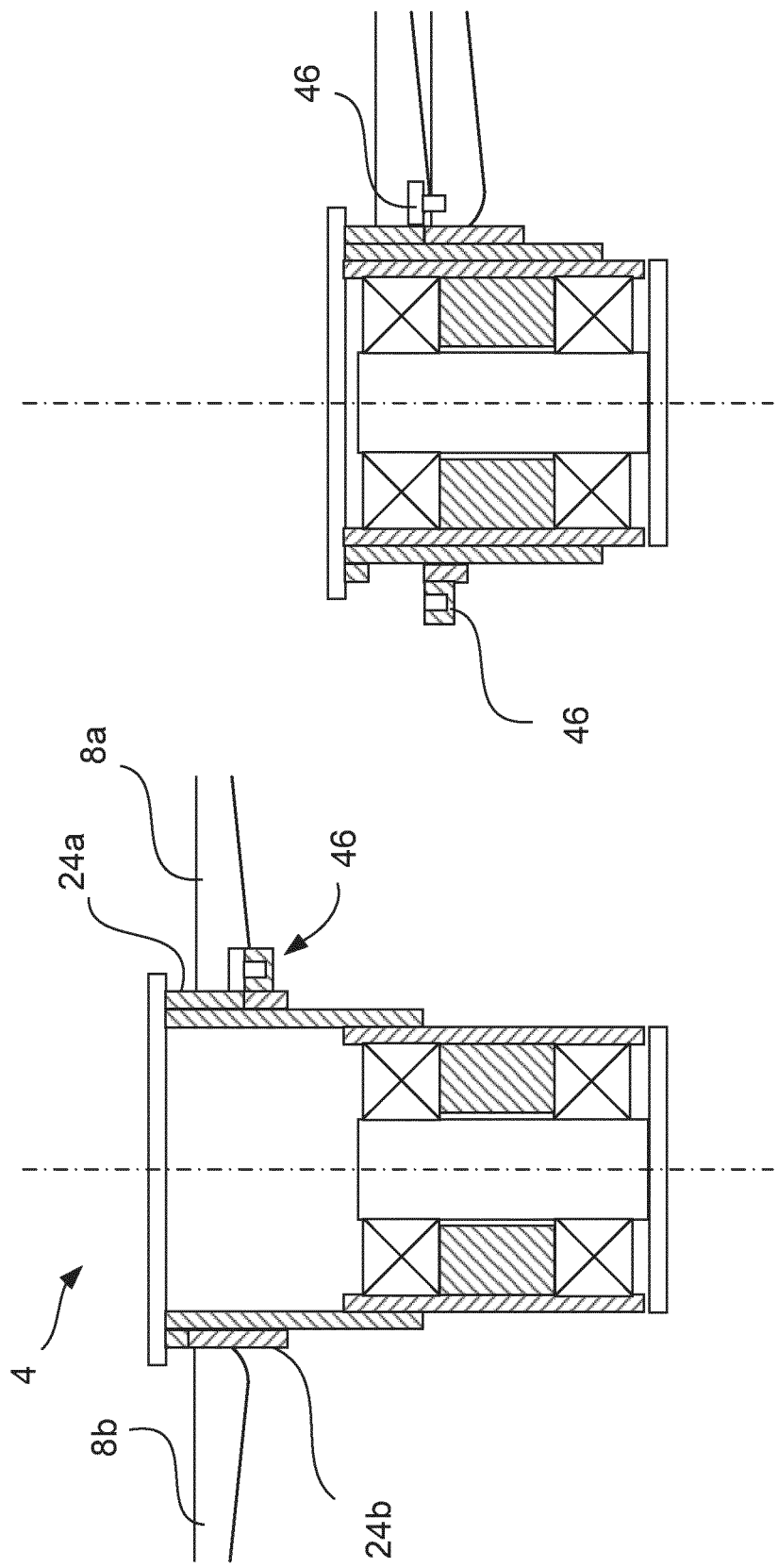

PROPELLER FOR AN AIRCRAFT

TECHNICAL FIELD

The invention relates to a propeller for an aircraft according to the appended claims. Further, the invention relates to an aircraft according to the appended claims.

BACKGROUND AND PRIOR ART

Propellers may be used in vehicles, such as aircraft for both vertical and horizontal thrust. The propellers are connected to engines or motors, which may be driven by combustible fuel as a propulsion source and/or be driven by electric power. In addition to propellers for providing vertical thrust and lifting force in an aircraft, fixed wings may be used for providing lifting force during forward flight.

Aircraft may use a combination of fixed wings and propellers for both vertical and horizontal thrust. Such aircraft are able to perform very short takeoffs and landings. They are also able to hover in the air above the ground. During forward flight the propellers for vertical thrust may be deactivated and kept stationary. However, the stationary propellers may produce large amounts of aerodynamic drag due to flow separation and large frontal area from the blades. This reduces the performance of the aircraft, such as reduced speed and increased fuel and power consumption. There are known aircraft, which align deactivated two-bladed propellers in the flow direction, which may result in lower drag. There are also known aircraft provided with four-bladed propellers, which are collapsible in a two-bladed propeller formation, and which may be aligned when deactivated. Thus, when deactivated, the in-line propeller blades may be aligned with the flow direction, which may result in lower drag.

Document U.S. Pat. No. 9,540,103 B2 discloses a vertical takeoff and landing aircraft provided with four-bladed propellers, the blades of which being collapsible and aligned when deactivated.

SUMMARY OF THE INVENTION

Despite known aircraft, which are provided with propellers which may be aligned with the flow direction when deactivated, there is still a need to increase the performance of aircraft, such as increasing the speed and decreasing the fuel and power consumption when deactivating propellers for vertical thrust during forward flight. By the term "aircraft" is here meant to include any aerial vehicle such as manned or unmanned aerial vehicles, drones, airplanes etc.

The object of the invention is therefore to develop a propeller for an aircraft, which increases the performance of the aircraft when deactivating the propeller during forward flight. A further object of the invention is to develop an aircraft provided with such propeller.

A further object of the invention is to decrease the frontal area of the propeller, in particular by up to 50% compared to an unfolded propeller arrangement. A further object is to enable the storage of the propeller in an aerodynamic compartment during cruise flight.

These objects are achieved with the above-mentioned propeller for an aircraft according to the appended claims.

These objects are also achieved with the above-mentioned aircraft according to the appended claims.

According to an aspect of the invention a propeller for an aircraft is provided. The propeller comprises at least two blades, arranged about a central hub, which is coupled to at least one motor, driven by a power source, wherein at least one blade is attached to at least one sleeve member, configured for being in an outer sliding connection to a first cylindrical element of the hub, wherein an inner surface of said at least one sleeve member comprises at least one projecting element, configured to be in a sliding connection with a corresponding at least one first recessed guide path, arranged in an outer surface of the first cylindrical element, wherein each first recessed guide path circles at least partly around the first cylindrical element from a first position to a second position, wherein each of said at least one sleeve member positions its blade in an operational position when its, at least one, projecting element is positioned in its corresponding first position in its designated first recessed guide path of the first cylindrical element, wherein each of said at least one sleeve member positions its blade in a storage position when its, at least one, projecting element is positioned in its corresponding second position in its designated first recessed guide path of the first cylindrical element, and wherein a rotation of the first cylindrical element moves each sleeve member thereabout along their first recessed guide path.

Preferably, only one blade is attached to each sleeve member. The number of blades being attached to a sleeve member thus preferably corresponds to the number of sleeve members. For example, if two blades are attached to sleeve members, two sleeve members will be comprised each being provided with one blade.

Such propeller is capable of increasing the performance of an aircraft. The propeller may be deactivated and kept stationary during forward flight. The frontal area of the propeller blades will be decreased during deactivation of the propeller. This will reduce the aerodynamic drag and flow separation when deactivating propellers for vertical thrust.

Preferably, at least one blade is attached to a cylindrical element. In such embodiments, the propeller comprises at least two blades, one being attached to a sleeve member and one blade being attached to the cylindrical element. In such embodiments, all blades except for the blade being attached to the cylindrical element which preferably is fixedly attached, are attached to the sleeve members whereby preferably each sleeve member comprised will be provided with one blade each.

According to the present invention, an aircraft is provided. The aircraft comprises at least one wing and at least one propeller as disclosed herein.

The speed of such aircraft during forward flight will increase by reducing the aerodynamic drag and flow separation when deactivating the propellers used for vertical thrust. In addition, the fuel and power consumption for propulsion of the aircraft will decrease. The at least one wing of the aircraft provides lifting force during forward flight.

According to one embodiment, a projecting element is arranged on at least one blade instead of on the inner surface of each sleeve. The blade can in such embodiment still be arranged on a sleeve member as further disclosed herein.

Additional objectives, advantages and novel features of the invention will be apparent to one skilled in the art from the following details, and through exercising the invention. While the invention is described below, it should be apparent that the invention is not limited to the specifically described details. One skilled in the art, having access to the teachings herein, will recognize additional applications, modifications and incorporations in other areas, which are within the scope of the invention.

BRIEF DESCRIPTION OF THE DRAWINGS

For fuller understanding of the present disclosure and further objects and advantages of it, the detailed description set out below should be read together with the accompanying drawings, in which the same reference notations denote similar items in the various figures, and in which:

FIGS. 4c and 4d schematically illustrate in a section view of the propeller with four propeller blades in an operational position, and in a deactivated storage position;

FIGS. 8a and 8b schematically illustrate the propeller in the operational position and the storage position provided with a locking mechanism according to an example.

DETAILED DESCRIPTION OF THE DRAWINGS

Figure 1A:
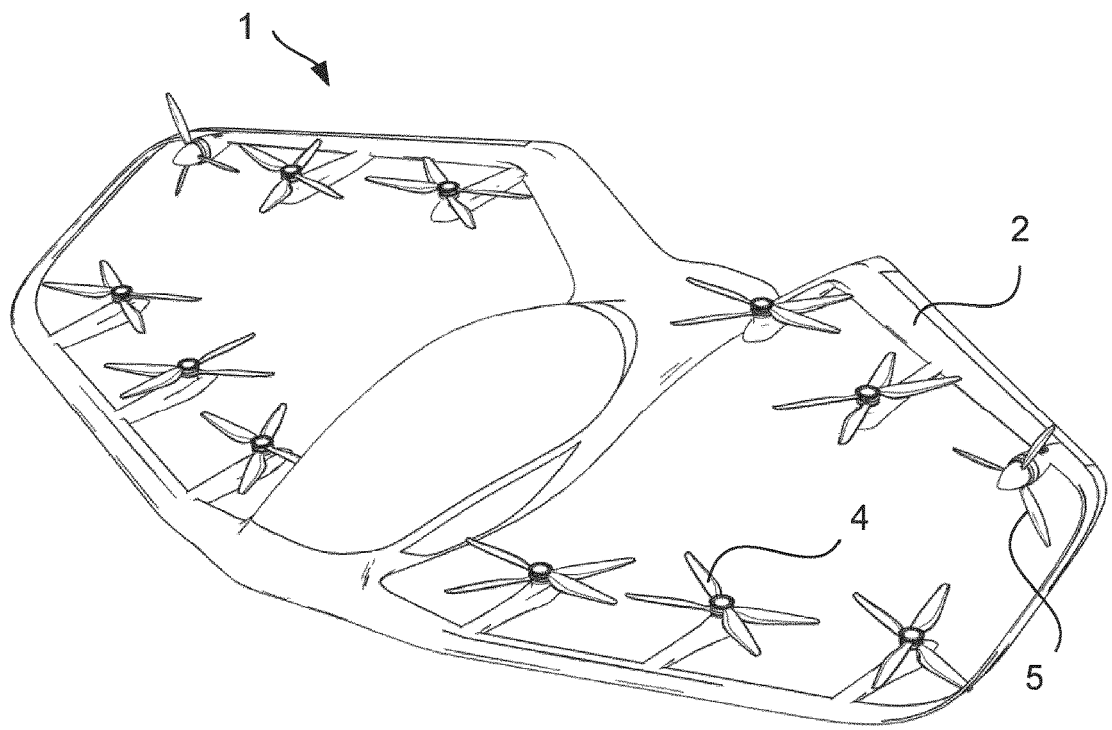
FIG. 1a schematically illustrates in a view of perspective an aircraft according to an example.

According to the present disclosure, a propeller for an aircraft is provided. The propeller comprises at least two blades, arranged about a central hub, which is coupled to at least one motor, driven by a power source, wherein at least one blade is attached to a sleeve member, configured for being in an outer sliding connection to a first cylindrical element of the hub, wherein an inner surface of each sleeve member, comprises at least one projecting element, configured to be in a sliding connection with a corresponding at least one first recessed guide path, arranged in an outer surface of the first cylindrical element, wherein each first recessed guide path circles at least partly around the first cylindrical element from a first position to a second position, wherein each sleeve member positions its blade in an operational position when its, at least one, projecting element is positioned in its corresponding first position in its designated first recessed guide path of the first cylindrical element, wherein each sleeve member positions its blade in a storage position when its, at least one, projecting element is positioned in its corresponding second position in its designated first recessed guide path of the first cylindrical element, and wherein a rotation of the first cylindrical element moves each sleeve member thereabout along their first recessed guide path.

The propeller comprises at least two propeller blades. Thus, the propeller may comprise for example two propeller blades, three propeller blades or four propeller blades. The propeller may comprise more than four propeller blades. The number of propeller blades depends on the thrust and power needed from the propeller. In addition, the number of propeller blades may have an impact on the noise level emanating from the rotation of the propeller. The propeller preferably has a propeller axis. In an operational mode, when the propeller rotates, the propeller blades preferably rotate about the propeller axis. The propeller blades may be configured to have an extension, which is orthogonal to the propeller axis. One or plural propeller blades such as all propeller blades, may also, as an alternative, have an extension, which is angled and not orthogonal to the propeller axis. The propeller blades of a two-blade propeller may extend along a line, which cross the propeller axis. Alternatively, the propeller blades of a two-blade propeller may each extend along a line, which lines are in parallel to each other and pass the propeller axis on each side at an equal distance. The propeller may be configured for providing vertical thrust. Vertical thrust to an aircraft may be provided when the propeller axis has a vertical extension when mounted on the aircraft.

The aircraft may be provided with the propeller configured for providing vertical thrust. The aircraft may also be provided with at least one propeller configured for providing horizontal thrust. During take-off and landing of the aircraft the at least one propeller configured for providing vertical thrust is activated. During horizontal flight, all or some of the propellers configured for providing vertical thrust are deactivated. The at least one propeller configured for providing horizontal thrust is activated during horizontal flight. Fixed wings may be used for providing lifting force during forward flight. Alternatively, or in combination with the wings, some of the propellers configured for providing vertical thrust may be activated for providing vertical thrust and thus also a lifting force.

The central hub may have a rotationally symmetrical axis coinciding with the propeller axis. The propeller blades may be configured to have an extension, which is orthogonal to the rotationally symmetrical axis of the central hub. The propeller blades may alternatively have an extension, which has an angle to the rotationally symmetrical axis of the central hub. The propeller blades of a two-blade propeller may extend along a line, which cross the rotationally symmetrical axis of the central hub. Alternatively, the propeller blades of the two-blade propeller may each extend along a line, which lines are in parallel to each other and pass on each side at an equal distance of the rotationally symmetrical axis of the central hub.

The at least one motor may be an electric motor. Alternatively, or in combination with the electric motor, the motor may be a combustion engine, such as an internal combustion engine or a turbine engine. The rotational motion generated by the motor will rotate the central hub. The rotational motion of the central hub will generate a rotational motion of the propeller. The central hub comprises a first cylindrical element, which is provided with an outer surface.

The power source may be a power storage unit, such as a battery, for storage of electrical power. Alternatively, the power source may be a power storage unit, such as a container or tank for storage of combustible fuel, such as petrol or another liquid fuel or gas fuel. The power source may be arranged on-board of the aircraft.

The sleeve member may have a circular configuration, provided with an inner surface and an outer surface. A propeller blade or blades may be attached to the outer surface of the sleeve member. The inner surface of the sleeve member is configured to slide on the outer surface of the first cylindrical element of the central hub. Thus, the sleeve member has an inner diameter, which is larger than the outer diameter of the first cylindrical element of the central hub. The sliding connection between the sleeve member and the first cylindrical element of the central hub provides for and enables an axial displacement of the sleeve member in the direction of the rotationally symmetrical axis of the central hub and thus also in the direction of the propeller axis. The sliding connection between the sleeve member and the first cylindrical element of the central hub can also provide for a rotational movement of the sleeve member in relation to the first cylindrical element of the central hub.

The at least one first recessed guide path is arranged in the outer surface of the first cylindrical element. The at least one projecting element, which is arranged in the inner surface of a sleeve member protrudes into the first recessed guide path in the outer surface of the first cylindrical element. The projecting element is allowed to move within the first recessed guide path when the sleeve member slides on the outer surface of the first cylindrical element. Thus, the first recessed guide path guides the movement and the direction of the sleeve member when the sleeve member slides on the outer surface of the first cylindrical element. The projecting element of the sleeve member may move between the first position and second position of the first recessed guide path. The first position and second position of the first recessed guide path may be end positions of the first recessed guide path.

The propeller blades of the propeller may be arranged in an operational position, wherein the propeller may generate thrust during rotation. When the propeller is deactivated, the propeller blades may be arranged in a storage position, wherein the propeller is configured to be accommodated in a compartment. An arrangement comprising a compartment is thus provided configured for accommodating a deactivated propeller. In the storage position, the propeller is kept stationary. The frontal area of the propeller blades will be decreased in the storage position, which will reduce the aerodynamic drag and flow separation during forward flight. Preferably, the frontal area, when the propeller blades are in a storage position, preferably when the entire propeller including the propeller blades is accommodated in a compartment such as a fairing, is decreased by up to 50%.

The first at least one recessed guide path may circle at least partly around the first cylindrical element of the central hub from the first position to the second position. The at least one first recessed guide path may have a configuration, which is adapted to the configuration of the propeller blades. The first at least one recessed guide path may have a linear shape or a curved shape. The first at least one recessed guide path may have both linear and curved shapes along the extension in the surface of the outer surface of the first cylindrical element.

According to an aspect, the storage position of each blade is aligned at the same angular position extending radially from the propeller axis and the first cylindrical element in the same direction. Thus, in the storage position, when the propeller is deactivated, the exposed area of the propeller in the flight direction of the aircraft is as small as possible. This is achieved by arranging the propeller blades in the same angular position in the same radial direction. When the propeller blades are aligned at the same angular position, they extend in parallel in the same radial direction from the first cylindrical element.

According to one aspect of the invention, at least one blade, e.g. an uppermost blade or a lowermost blade, i.e. a blade arranged at an extreme end about the central hub, is fixedly attached to the first cylindrical element, preferably at the same angular position about the central hub as in its corresponding storage position. The first cylindrical element has first and second ends. Arranging the propeller on the aircraft for vertical thrust, the propeller axis extends in a vertical direction. Thus, also a central axis of the first cylindrical element may be arranged in a vertical direction when the propeller is mounted on the aircraft, since the central axis of the first cylindrical element coincides with the propeller axis. The uppermost propeller blade may be fixedly attached to the first cylindrical element at a distal position of the first cylindrical element. A propeller blade arranged at an extreme end about the central hub, e.g. an uppermost blade when arranged at an aircraft, is arranged above the other propeller blades in the storage position. Such extremely arranged propeller blade such as an uppermost propeller blade may be fixedly attached directly to the first cylindrical element. Alternatively, such propeller blade arranged at an end about the central hub, e.g. an uppermost propeller blade, can be fixedly attached to the outer surface of the sleeve member, and the sleeve member, comprising such propeller blade such as an uppermost propeller blade, can be configured to be fixedly attached to the first cylindrical element. Also, the propeller blade such as an uppermost propeller blade can be fixedly attached directly to the first cylindrical element. Preferably, the further propeller blades, other than such propeller blade arranged at an extreme end about the central hub such as an uppermost propeller blade, are allowed to rotate and move axially in relation to the first cylindrical element. The other blades are thus able to rotate and move axially in relation to the first cylindrical element. Thus, from an operational position to the storage position, the uppermost propeller blade will follow the motion of the first cylindrical element. The other propeller blades may rotate and move axially in relation to the first cylindrical element during the movement from the operational position to the storage position.

According to one embodiment, the propeller blades are configured to be axially movable in relation to the first cylindrical element during movement from the operational position to the storage position, preferably a storage position in said compartment.

According to one embodiment, a compartment such as a fairing is configured to be axially movable in relation to the first cylindrical element. In such embodiment, the propeller blades change positions from operational position to storage position and vice versa, preferably without being displaced axially. However, embodiments wherein both the compartment such as a fairing and the propeller blades move relative to each other so as to change position of the propeller blades from a storage position and operational position are also possible even though not preferred. According to an aspect, a second recessed guide path having a second position or extension being arranged below or above said at least one first recessed guide path at the first cylindrical element, preferably has a longer path length between its first and second position, compared to the at least one first recessed guide path. According to one embodiment, a second recessed guide path having a second recessed guide path is arranged below or above an inner surface of the first cylindrical element. According to one embodiment, a second recessed guide path is arranged at a sleeve on a radial inner or outer surface of said at first cylindrical element. This may be in particular preferred in embodiments according to which the compartment, e.g. the fairing is axially displaced instead of the propeller. By the terms "below" or "above" said at least one first recessed guide path is meant at a position or extension closer or further away relative to a storage position which storage position is aimed to be below the guide paths in an operational mode, i.e. when the propeller is arranged on an aircraft. The terms "below", "above", "uppermost", "lowermost" etc. are also generally, as used herein, referred to as positions of parts or elements in relation to other parts or elements when the propeller or arrangement is mounted on an aircraft. Such second recessed guide path, which preferably has a longer path length between its first and second position, compared to the at least one first recessed guide path is configured to cooperate with a fixed or non-fixed projecting element during an axial movement of the first cylindrical element and a rotational movement of the first cylindrical element, i.e. a movement about the central hub. Preferably, such second recessed guide path can guide the first cylindrical element to the storage position. Preferably, such second recessed guide path can keep the first cylindrical element into the storage position after the guidance of the first cylindrical element to the storage position.

According to an aspect, the second recessed guide path having a second position or extension, has a lower accumulated/overall path angle between its first and second position, compared to the at least one first recessed guide path. Guiding the first cylindrical element to the storage position will at a first step result in a short axial movement of the first cylindrical element. Thereafter the first cylindrical element will follow a rotational motion, preferably while performing a slight axial movement. Finally, the first cylindrical element will preferably be guided in both the axial and the rotational direction to an end position in the second recessed guide path, in which the first cylindrical element will be kept in the storage position.

According to an aspect, each sleeve member preferably comprises a first end section being flat, and a second end section that comprises at least one high point and at least one low point, compared to an average height of the second end section, wherein the sleeve members preferably are arranged on the first cylindrical element so that first end sections of adjacent sleeve members face each other, and second end sections of adjacent sleeve members face each other. The at least one high point of the second end section may be configured to fixate the sleeves in the operational position of the propeller. In the operational position, the propeller blades are preferably configured to provide thrust and lifting force to the aircraft. The flat configuration of the first end section of the sleeve member may allow two adjacent sleeve members to slide on each other.

According to an aspect of the invention, the hub is operated by a second cylindrical element, which is coupled to the at least one motor. The second cylindrical element is preferably connected to the first cylindrical element. The motor is configured to generate a rotational motion of the second cylindrical element. The motor may generate a forward and rearward rotational motion of the second cylindrical element. The rotational motion of the second cylindrical element is configured to generate a motion of the first cylindrical element. The rotational motion of the second cylindrical element generates a rotational motion of the first cylindrical element. The motor is preferably configured to generate a rotational motion of both the first and second cylindrical elements. The motor may be arranged in the second cylindrical element. A central axis of the motor may coincide with a central axis of the second cylindrical element. A rotatable part of the motor may be connected to the second cylindrical element. The rotatable part of the motor may be connected to an inner surface of the second cylindrical element.

According to an aspect of the invention, the second cylindrical element further comprises at least one third recessed guide path, arranged in an outer surface of the second cylindrical element, wherein an inner surface of the first cylindrical element comprises at least one projecting element, configured to be in a sliding connection with the corresponding at least one third recessed guide path, arranged in the outer surface of the second cylindrical element, wherein a rotation of the second cylindrical element transfers said rotation and moves the first cylindrical element along a length of the at least one third recessed guide path. The at least one third recessed guide path may alternatively be arranged in the inner surface of the first cylindrical element and the projecting element may be arranged in the outer surface of the second cylindrical element and be configured to be in a sliding connection with the third recessed guide path. The third recessed guide path may have a configuration that allows the first cylindrical element to rotate relative to the second cylindrical element. The third recessed guide path may have a configuration that allows the first cylindrical element to move axially relative to the second cylindrical element. The third recessed guide path may have a configuration that allows the first cylindrical element to rotate with the same rotational speed as the second cylindrical element.

According to an aspect of the invention, a rotation of the second cylindrical element in a direction corresponding to the propeller moving forward for generating thrust, biases at least one propeller blade to move from its storage position towards its operational position by means of rotation of its sleeve member about the first cylindrical element. The third recessed guide path in the second cylindrical element will, together with the second recessed guide path in the first cylindrical element guide the first cylindrical element to move both in a rotational and axial direction. The rotational motion of both the first and second cylindrical elements will generate a motion of the at least one propeller blade to move from its storage position towards its operational position. This is preferably achieved by the airflow affecting and biasing the at least one propeller blade to move, together with its sleeve member relative to the first cylindrical sleeve. Alternatively, or in combination with the airflow, the inertia of the propeller blade may cause and bias the propeller blade to move, together with its sleeve member relative to the first cylindrical sleeve. In addition, the second recessed guide path may guide the propeller blade to move, together with its sleeve member relative to the first cylindrical sleeve.

According to an aspect, at least one locking mechanism is configured to selectively lock each sleeve member in the operational position of the blades. The at least one locking mechanism may lock at least two sleeve members to each other. Such locking mechanism may comprise at least one magnet, for example one magnet attached at the cylindrical element and two at a sleeve member or any number of magnets to safeguard accurate locking. The at least one locking mechanism may increase the stability of the propeller in the operational position. When controlling the propeller to the storage position, the at least one locking mechanism will automatically unlock each sleeve member.

According to an aspect, said propeller comprises two blades. Such propeller may be adapted to the type of aircraft to be driven by the propeller.

According to an aspect, said propeller comprises four blades. Such propeller may be adapted to the type of aircraft to be driven by the propeller.

The invention also relates to an arrangement comprising a propeller as further described herein, wherein the arrangement further comprises a compartment, such as a fairing, configured to accommodate the propeller.

According to the present disclosure an aircraft is provided. The aircraft comprises at least one wing and at least one propeller as disclosed herein. The aircraft may be provided with the propeller configured for providing vertical thrust. The aircraft may also be provided with at least one propeller configured for providing horizontal thrust. During take-off and landing of the aircraft the at least one propeller configured for providing vertical thrust is activated. During horizontal flight, all or some of the propellers configured for providing vertical thrust are deactivated. The at least one propeller configured for providing horizontal thrust is activated during horizontal flight. Fixed wings may be used for providing lifting force during forward flight. Alternatively or in combination with the wings, some of the propellers configured for providing vertical thrust may be activated for providing vertical thrust and thus also a lifting force.

According to an aspect of the invention, the aircraft comprises a compartment for accommodation of the at least one propeller and/or the propeller blades of the propeller. Certain parts pertaining to the propeller may thus be stored outside the compartment, preferably without increasing the drag when the propeller is mounted on an aircraft. Preferably, the compartment is designed to accommodate said at least one propeller entirely. The compartment may be a fairing which is mounted on the aircraft. The compartment preferably has an aerodynamic shape, which reduces the drag in the forward motion of the aircraft. The compartment may be provided with an opening for receiving the propeller. The opening may be provided with a movable hatch which may be flexible as such. At least one of the propeller blades may be configured to open the hatch. The hatch may be closable by the inherent flexibility of the hatch. Alternatively, the hatch may be pivotally or slidably arranged at the compartment and controlled by an actuator. Thus, an arrangement for storing the propeller including the aligned blades is provided resulting in a considerable reduction in drag when in operation.

According to one embodiment, the compartment is provided with a guide path such as a recessed guide path enabling axial displacement of the compartment, e.g. a fairing, relative to the blades of the propeller. It may be actuated by one or more projecting or protruding elements on a cylindrical element such as the first cylindrical element to enable or facilitate the displacement of the compartment.

The propeller and the aircraft will now be described together with the appended drawings.

FIG. 1a schematically illustrates in a view of perspective an aircraft 1 according to an example. The aircraft 1 comprises wings 2. The aircraft 1 is provided with propellers 4 configured for providing vertical thrust. The aircraft 1 is also provided with propellers 5 configured for providing horizontal thrust.

Figure 1B:
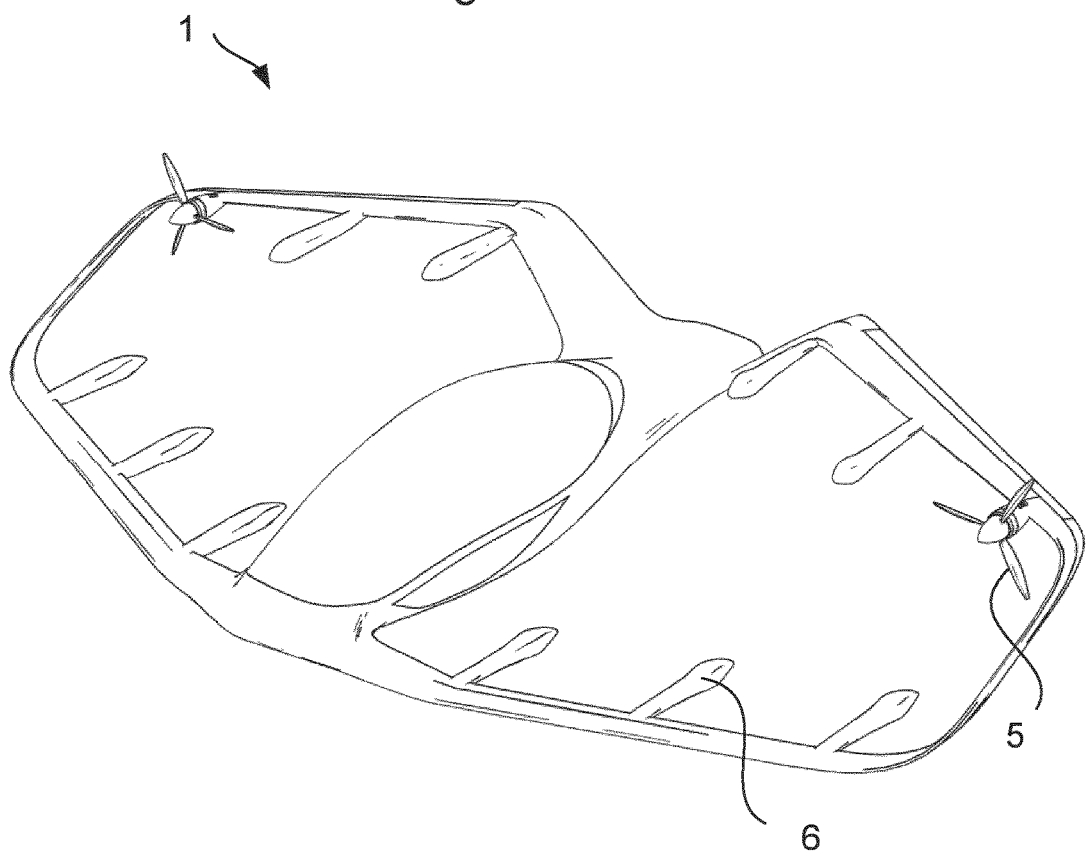
FIG. 1b schematically illustrates in a view of perspective the aircraft according to FIG. 1a with retracted propellers.

FIG. 1b schematically illustrates in a view of perspective the aircraft 1 according to FIG. 1a with retracted propellers 4 for vertical thrust. The propellers 4 configured for vertical thrust may be arranged in a storage position when deactivated. In the storage position, the propellers 4 are retracted and are kept stationary. The aircraft 1 comprises compartments 6 for accommodation of the propellers 4. The compartments 6 may be fairings of the aircraft 1. The compartments 6 may have an aerodynamic shape, which reduces the drag in the forward motion of the aircraft 1. The propellers 5, which are configured for providing horizontal thrust are in an operational position and are thus not retracted to a storage position.

Figure 2A:
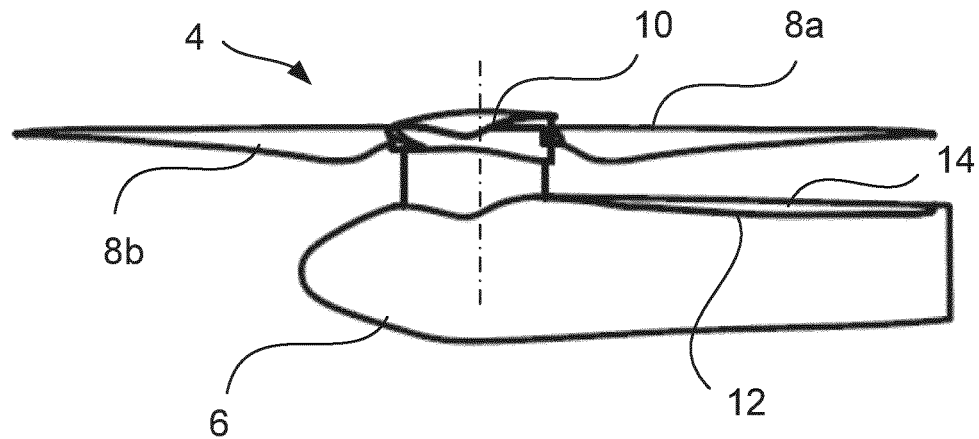
FIGS. 2a-2c schematically illustrate in side views the propeller in an operational position, the propeller during retraction to a storage position and the propeller deactivated in a storage position.
Figure 2B:
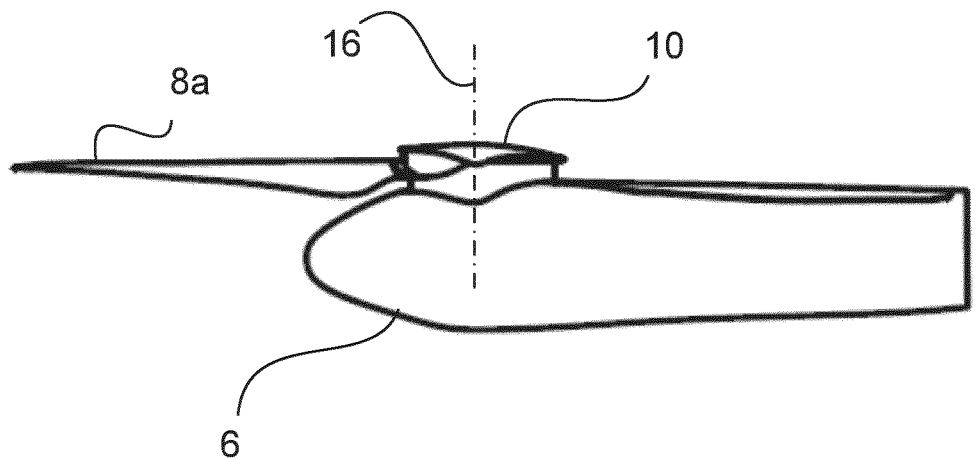
Figure 2C:
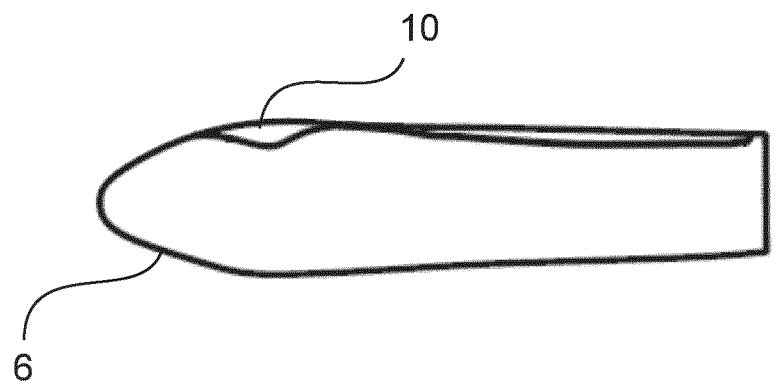

FIGS. 2a-2c schematically illustrate in side views the propeller 4 in an operational position, the propeller 4 during retraction to a storage position and the propeller 4 deactivated in a storage position. The propeller 4 in FIG. 2a is provided with two propeller blades 8a, 8b. Thus, the propeller in FIG. 2a has a first propeller blade 8a and a second propeller blade 8b. The propeller 4 is shown in an operational position. In the operational position, the propeller 4 may provide thrust to the aircraft 1. The propeller blades 8a, 8b and a hub 10, to which the propeller blades 8a, 8b are connected are shown outside of the compartment 6 or fairing in FIG. 2a. The compartment 6 is provided with an opening 12 for receiving the propeller 4. The opening 12 is opened and closed by a hatch 14. In FIG. 2a the opening 12 is closed by the hatch 14.

In FIG. 2b a part of the hub 10 has been moved downwards partly into the compartment 6 and the second propeller blade 8b has been moved into the compartment 6 by turning 180° about the propeller axis 16. The first propeller blade 8a has been moved 180° about the propeller axis 16 and is still outside the compartment 6.

In FIG. 2c both the propeller blades 8a, 8b and the hub 10 have been moved into the compartment 6. The propeller 4 is deactivated and arranged in the storage position. In the storage position, the propeller 4 is retracted and are kept stationary. The uppermost part of the hub 10, being most distal from the compartment 6, may have a shape that conforms with the outer shape of the compartment 6 at the position of the hub 10.

Figure 2D:
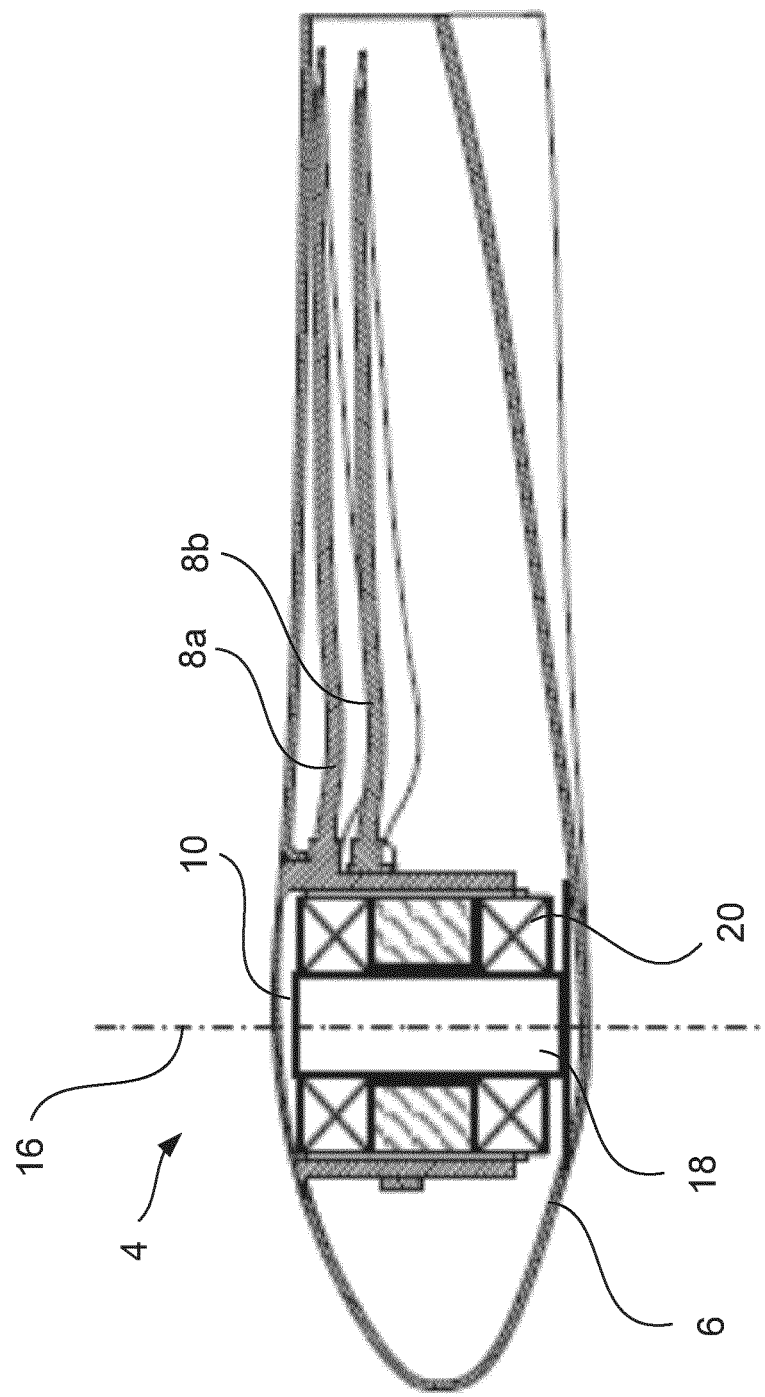
FIG. 2d schematically illustrates in a section view of the propeller deactivated in a storage position.

FIG. 2d schematically illustrates in a section view the propeller 4 deactivated in a storage position in the compartment 6. A motor 18 is arranged in the hub 10. Two bearings 20 are arranged in the hub 10. In the storage position of the propeller 4 the propeller blades 8a, 8b are aligned at the same angular position about the propeller axis 16. When the propeller blades 8a, 8b are aligned at the same angular position about the propeller axis 16, they extend in parallel in the same radial direction from the propeller axis 16. In the storage positions, the propeller blades 8a, 8b are arranged at different positions aligned at the same angular position about the propeller axis 16.

Figure 3:
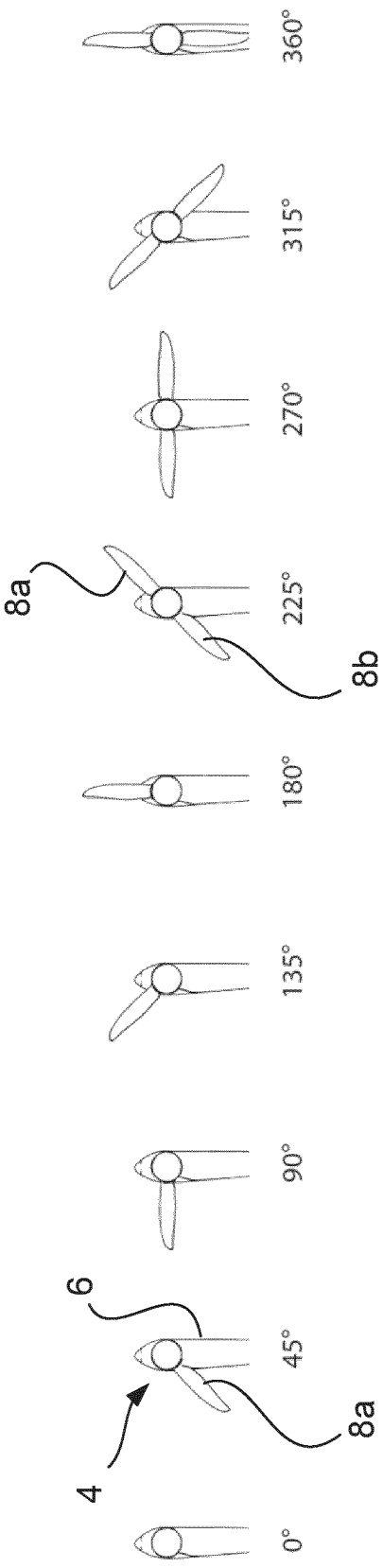
FIG. 3 schematically illustrates an unfolding propeller in views from above, when mounted in an aircraft, from a storage position to an unfolded operational position.

FIG. 3 schematically illustrates in views from above (when mounted on an aircraft) unfolding the propeller 4 from a storage position to an unfolded operational position. At 0° the propeller 4 is in the storage position. At 45° the first propeller blade 8a has left the compartment 6. At 225° the second propeller blade 8b has left the compartment 6. At 360° the propeller 4 is in the operational position.

Figure 4B:
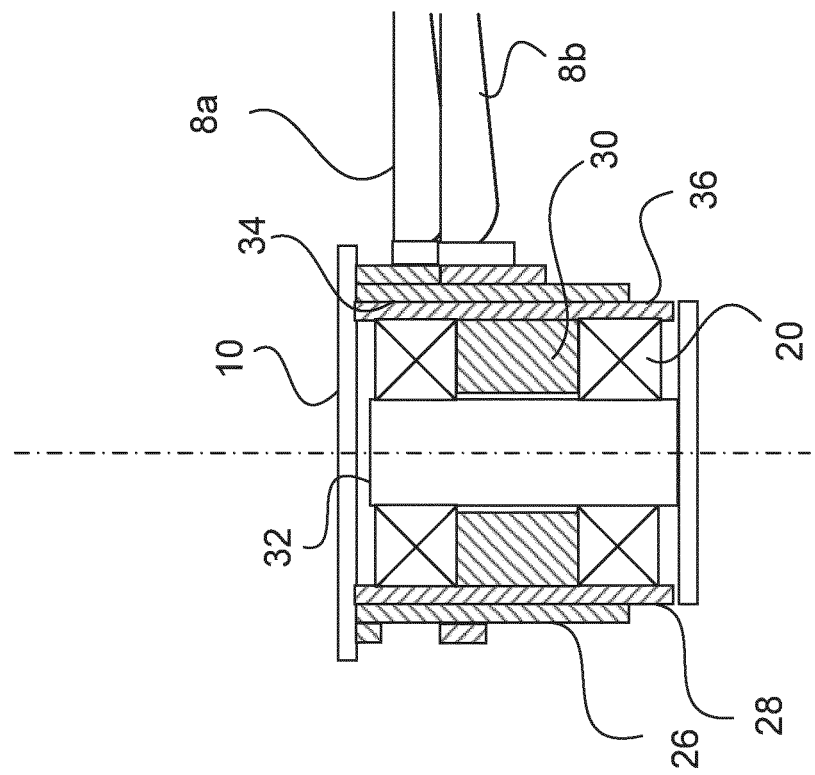
FIGS. 4a and 4b schematically illustrate in a section view of the propeller with two propeller blades in an activated and operational position, and in a deactivated storage position.
Figure 4A:
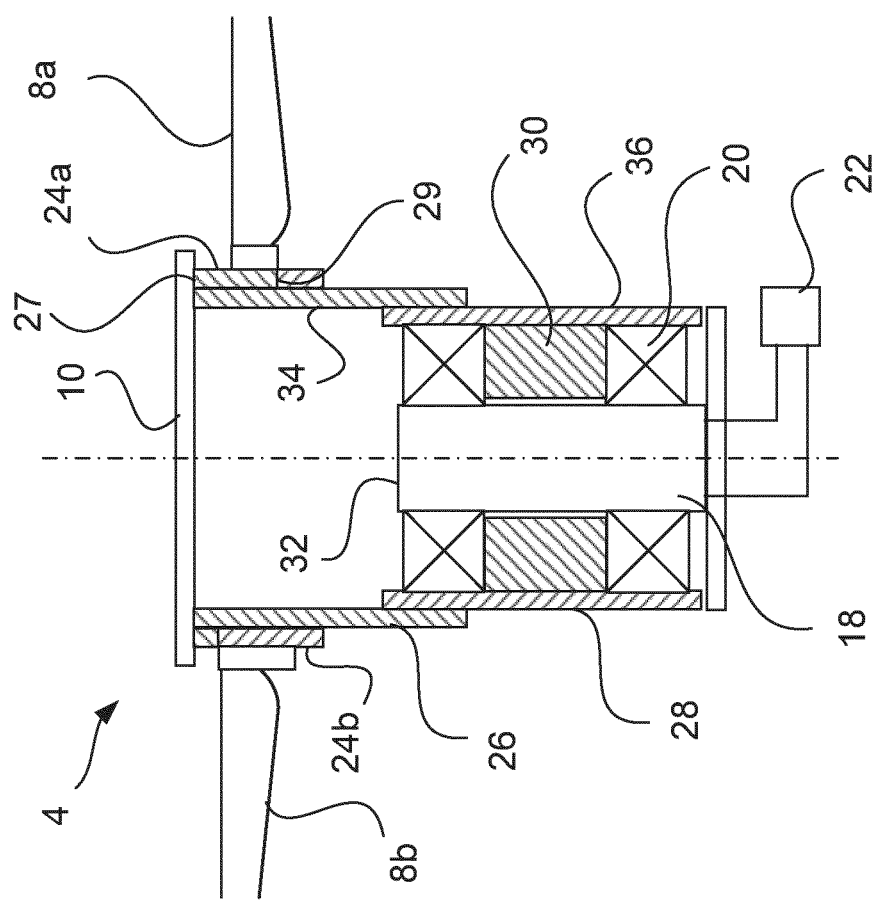

FIGS. 4a and 4b schematically illustrate in a section view of the propeller 4 with two propeller blades 8a and 8b in an activated and operational position, and in a deactivated storage position. In FIG. 4a the propeller 4 is in the operational position. The propeller blades 8a, 8b are arranged about the central hub 10, which is coupled to the motor 18. The motor 18 is driven by a power source 22. The first propeller blade 8a is attached to a first sleeve member 24a. The second propeller blade 8b is attached to a second sleeve member 24b. One or both of the sleeve members 24a, 24b may be configured for being in an outer sliding connection to a first cylindrical element 26 of the hub 10. However, the first sleeve member 24a may be fixedly attached directly to the first cylindrical element 26. The first propeller blade 8*a* may be an uppermost blade on the hub 10 when the propeller is mounted on an aircraft. The uppermost blade 8*a* may thus be fixedly attached to the first cylindrical element 26 at the same angular position as it is in the storage position. Each sleeve member 24*a*, 24*b* comprises a first end section 27 being flat, and second end section 29 that comprises at least one high point and at least one low point, compared to an average height of the second end section 29. The sleeve members 24*a*, 24*b* are arranged on the first cylindrical element 26 so that first end sections 27 of adjacent sleeve members 24*a*, 24*b* face each other, and second end sections 29 of adjacent sleeve members 24*a*, 24*b* face each other.

The hub 10 is operated by a second cylindrical element 28, which is coupled to the motor 18. The motor 18 has a rotational part 30, which is connected to the second cylindrical element 28. The motor 18 has a static part 32, which is attached to the compartment 6. Bearings are arranged between the static part 32 and an inner surface of the second cylindrical element 28. An inner surface 34 of the first cylindrical element 26 is slidably arranged on an outer surface 36 of the second cylindrical element 28. In the operational position, the first cylindrical element 26 embraces only a part of the second cylindrical element 28, so that the hub has an extended configuration.

A rotation of the second cylindrical element 28 in a direction corresponding to the propeller 4 moving forward for generating thrust, biases at least one propeller blade 8*a*, 8*b* to move from its storage position towards its operational position by means of rotation of its sleeve member 24*a*, 24*b* about the first cylindrical element 26.

In FIG. 4*b* the propeller 4 is in the storage position. In the storage position, each propeller blade 8*a*, 8*b* are aligned at the same angular position in a radial direction from the first cylindrical element 26. In the storage position the first cylindrical element 26 has slided down of the second cylindrical element 28. The longitudinal extension of the hub 10 in the storage position is shorter than the longitudinal extension in the operational position.

FIGS. 4*c* and 4*d* schematically illustrate in a section view of the propeller 4 with four propeller blades 8*a*, 8*b*, 8*c*, 8*d* in an operational position, and in a deactivated storage position. In FIG. 4*c* the propeller 4 is in the operational position. The propeller blades 8*a*-8*d* are arranged about the central hub 10, which is coupled to the motor 18. Each propeller blade 8*a*-8*d* is attached to a sleeve member 24*a*-24*c*. In FIG. 4*d* the propeller 4 is in the storage position. In the storage position, each propeller blade 8*a*-8*d* are aligned at the same angular position and extend in the same radial direction from the first cylindrical element.

Figure 4F:
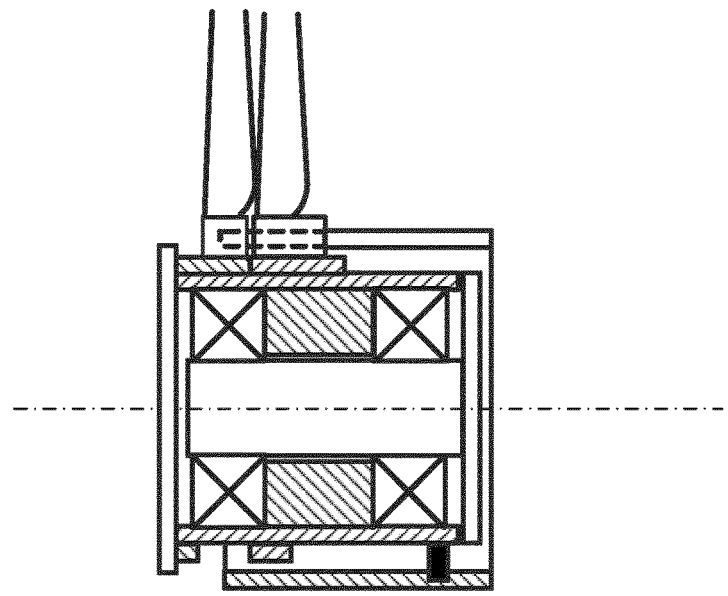
FIGS. 4e and 4f schematically illustrate in a section view of the propeller in operational and storage positions when the fairing is in different positions.
Figure 4E:
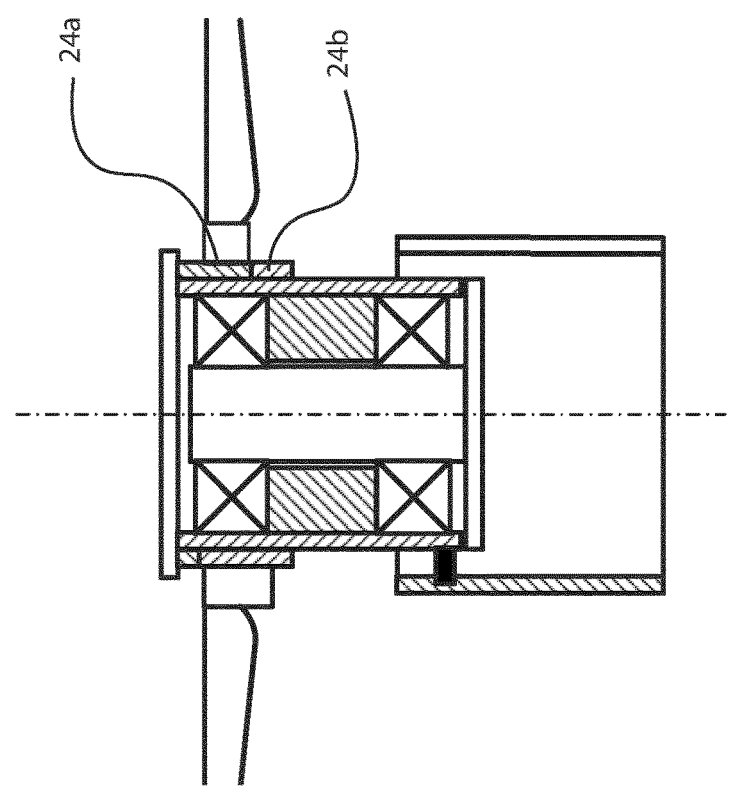

FIGS. 4*e* and 4*f* illustrate section views of the propeller in an operational position and storage position respectively. In FIG. 4*e*, the sleeve members 24*a*-*b* being in operation are positioned axially above the compartment (fairing). In FIG. 4*f*, the compartment has been displaced axially upwards to accommodate the propeller 4 the blades of which having been aligned.

Figure 4G:
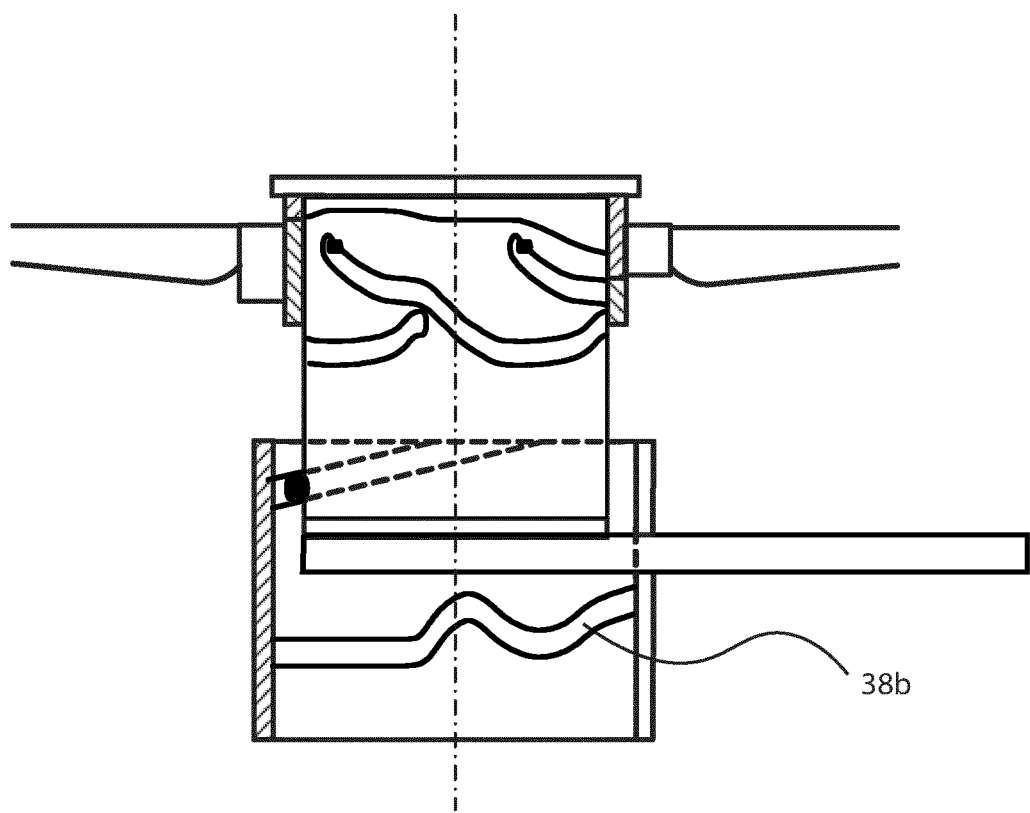
FIG. 4g schematically illustrate a fairing provided with a recessed guide path.

FIG. 4*g* illustrates a section view in which a second recessed guide path (38*b*) is arranged at a compartment such as a fairing which thereby can be axially displaced instead of the propeller. A second recessed guide path (38*b*) can also be arranged on the inside of a cylindrical element such as the first cylindrical element, on a separate cylinder or sleeve to enable axial displacement instead of the motor.

Figure 5:
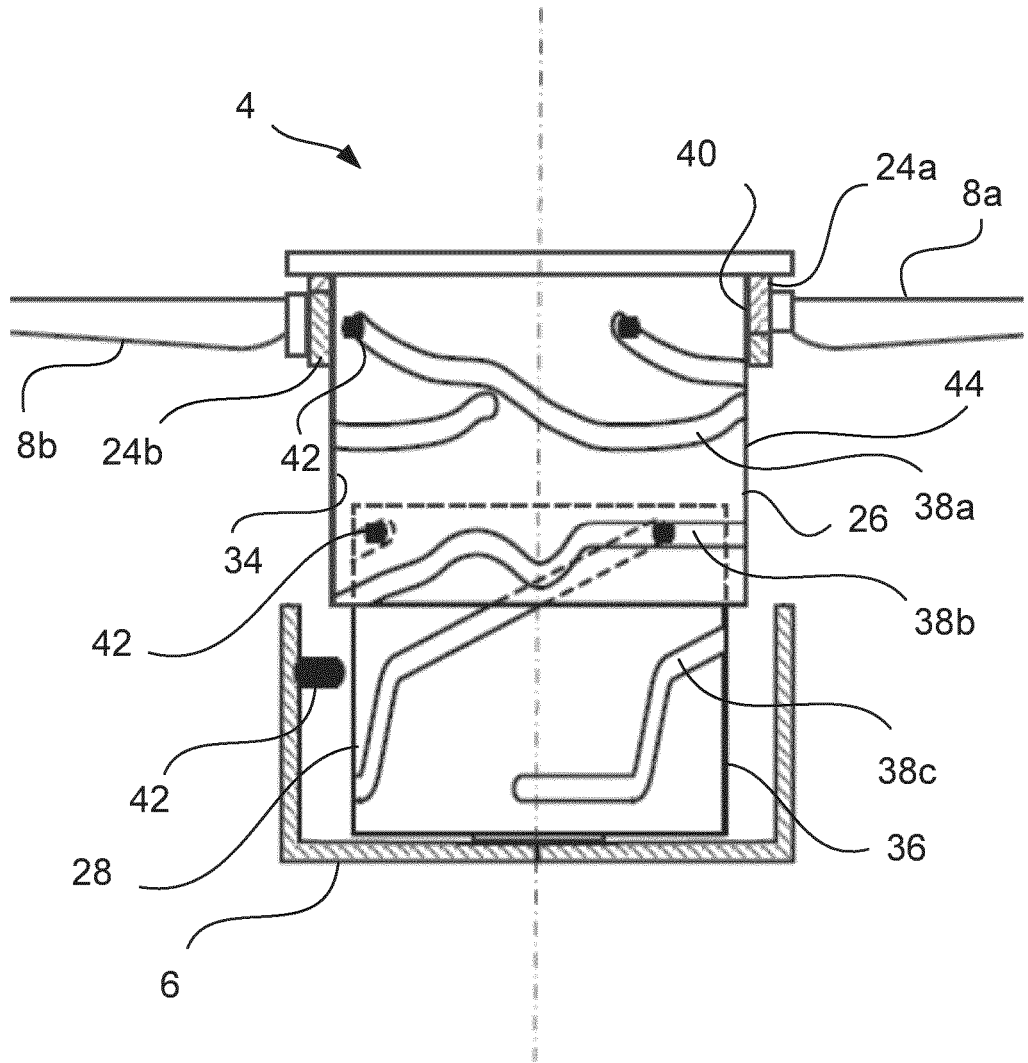
FIG. 5 schematically illustrates in a section view the propeller in an operational position, with different guide paths arranged in the propeller according to an example.

FIG. 5 schematically illustrates in a section view the propeller 4 in an operational position. Different guide paths 38*a*, 38*b*, 38*c* are arranged in the propeller 4 according to an example. The inner surface 40 of each sleeve member 24*a*, 24*b* comprises at least one projecting element 42, configured to be in a sliding connection with a corresponding at least one first recessed guide path 38*a*, arranged in an outer surface 44 of the first cylindrical element 26, wherein each first recessed guide path 38*a* circles at least partly around the first cylindrical element 26 from a first position to a second position, wherein each sleeve member 24*a*, 24*b* positions its blade in the operational position when its, at least one, projecting element 42 is positioned in its corresponding first position in its designated first recessed guide path 38*a* of the first cylindrical element 26. Each sleeve member 24*a*, 24*b* positions its blade 8*a*, 8*b* in a storage position when its, at least one, projecting element 42 is positioned in its corresponding second position in its designated first recessed guide path 38*a* of the first cylindrical element 26, and wherein a rotation of the first cylindrical element 26 moves each sleeve member 24*a*, 24*b* thereabout along their first recessed guide path 38*a*. A second recessed guide path 38*b* has a second position being arranged lower at the first cylindrical element 26 than the at least one first recessed guide path 38*a*, has a longer path length between its first and second position, compared to the at least one first recessed guide path 38*a*. The second recessed guide path 38*b* has a second position arranged lower at the first cylindrical element 26 than the at least one first recessed guide path 38*a* when being mounted on an aircraft. The second recessed guide path 38*b* has a lower accumulated/overall path angle between its first and second position, compared to the at least one first recessed guide path 38*a*. A projecting element 42, configured to be in a sliding connection with the corresponding second recessed guide path 38*b*, is arranged in the compartment 6.

The second cylindrical element 28 further comprises at least one third recessed guide path 38*c*, arranged in the outer surface 34 of the second cylindrical element 28, wherein the inner surface 34 of the first cylindrical element 26 comprises at least one projecting element 42, configured to be in a sliding connection with the corresponding at least one third recessed guide path 38*c*, arranged in the outer surface 36 of the second cylindrical element 28, wherein a rotation of the second cylindrical element 28 transfers said rotation and moves the first cylindrical element 26 along a length of the at least one third recessed guide path 38*c*. The at least one third recessed guide path 38*c* may alternatively be a vertical path configured as a spline path.

Figure 6A:
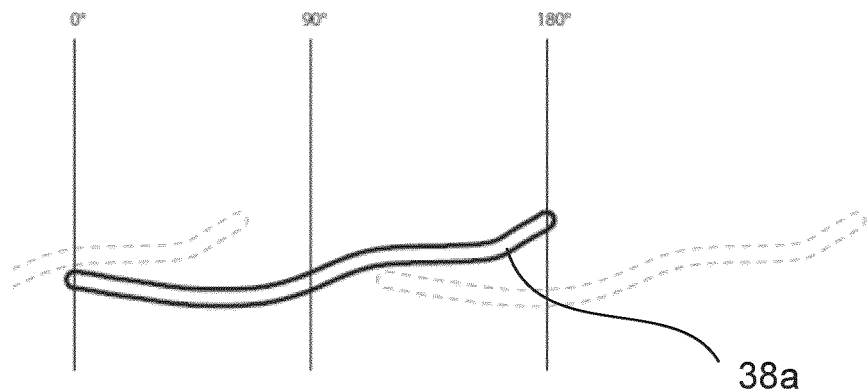
FIGS. 6a-6f illustrate different guide paths arranged in the propeller, which paths guide the propeller blades between the storage position and the operational position.
Figure 6B:
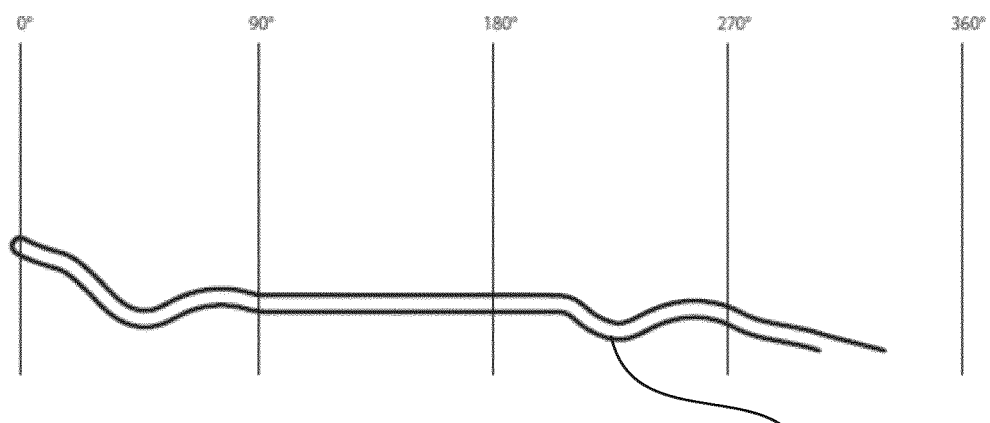
Figure 6C:
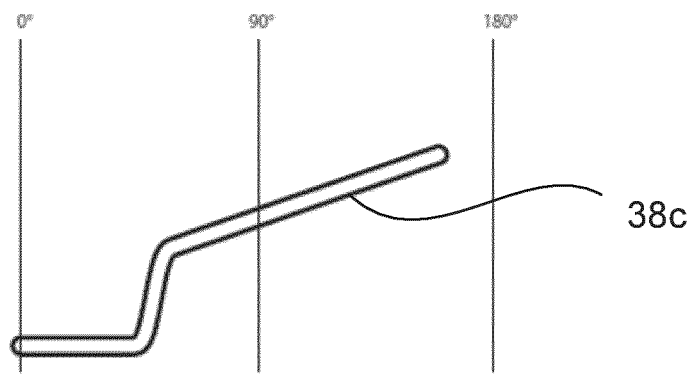

FIGS. 6*a*-6*f* illustrate the different guide paths 38*a*-38*c* arranged in the propeller 4 (see FIG. 5), which guide paths 38*a*-38*c* guide the propeller 4 between the storage position and the operational position. In FIG. 6*a* the first guide paths 38*a* are shown in a rotational interval of 0° to 180° of the first cylindrical element 26 (see FIG. 5). At about 0°, the blade(s) may be directed upwards for closer positioning of the blade(s). Between 0 and 90°, the path turns downwards for clearance below a second blade. Between 90° and 180°, a plateau is provided in the path providing space for the further paths. The slope of the angle is controlled by the clearance at the attachment of the second blade. In FIG. 6*b* the second guide path 38*b* is shown in a rotational interval of 0° to 360° of the first cylindrical element 26. The shape of the path adapted to the profile of the blade is actuated to the compartment at the inside of the hatch of the compartment close to 0°. At about 45°, the hatch for a second blade starts opening. Close to 90°, a second blade is actuated inside/outside the hatch. At 225° the hatch starts to open and a first blade is locked/cleared from the sleeve member. The first blade is actuated to/away inside of the compartment at about 270°. At about 315°, an opening for the projecting element of the compartment enables folding of blades to one single position. In FIG. 6c the third guide path 38c is shown in a rotational interval of 0° to 180° of the first cylindrical element 26 rotating about the second cylindrical element 28 (see FIG. 5). In FIG. 6c, the mechanism locks the folded blade(s) in the storage position, i.e. when arranged in the compartment at 0°. At about 45°, linear actuation starts to occur before/after initial/final movement in a further linear actuation. The mechanism may take place both for movement of blades towards or away from the compartment and for movement of the compartment towards and away from the blades. Thus, linear actuation at about 45° may occur whereby a provided projecting element of the compartment arrives at a substantially linear portion of the guide path when a (downward) pulling force is no longer needed. Between about 45° and 180°, the mechanism allows for movement towards/away from the projecting element of the compartment. The slope of this profile portion determines the force of such actuation.

Figure 6D:
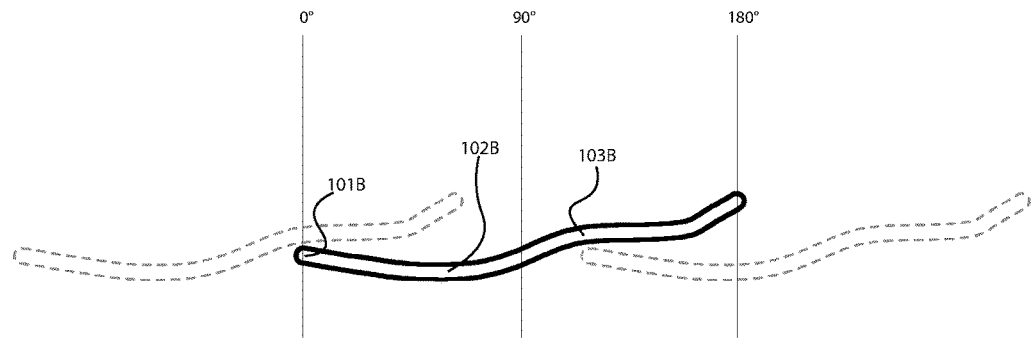

FIG. 6d shows at 101A a portion of the path where the blades are folded and locked. At 102A a portion of the path is shown where the slope determines the force by which the blade(s) are actuated towards/away from the compartment.

Figure 6E:
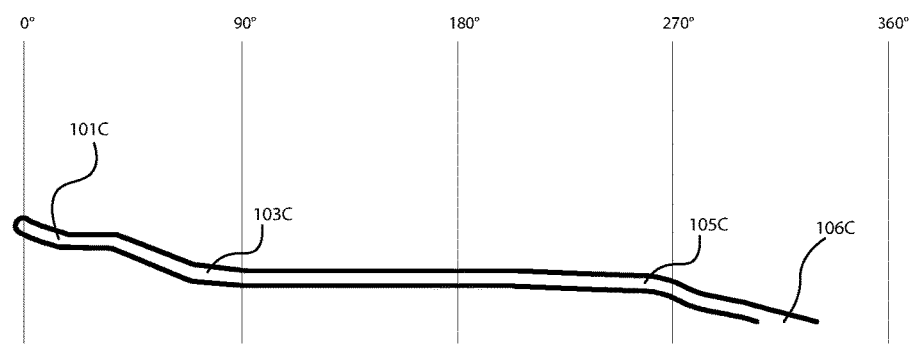

FIG. 6e shows at 101B a portion of the path where the blades are closely packed. At 102B illustrates clearance below a fixedly attached blade and 103B shows clearance for the further paths at the same height.

Figure 6F:
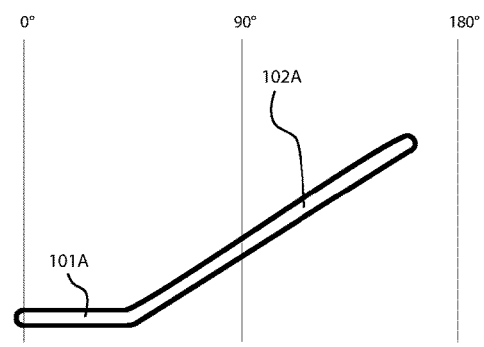

FIG. 6f shows at 101C adaptation for the propeller profile actuated to inside the hatch. At 103C, the second blade is actuated to inside of the hatch of the compartment. At 105C, the first blade is actuated to inside of the hatch. At 106C, an opening for a projecting element is provided.

Figure 7A:
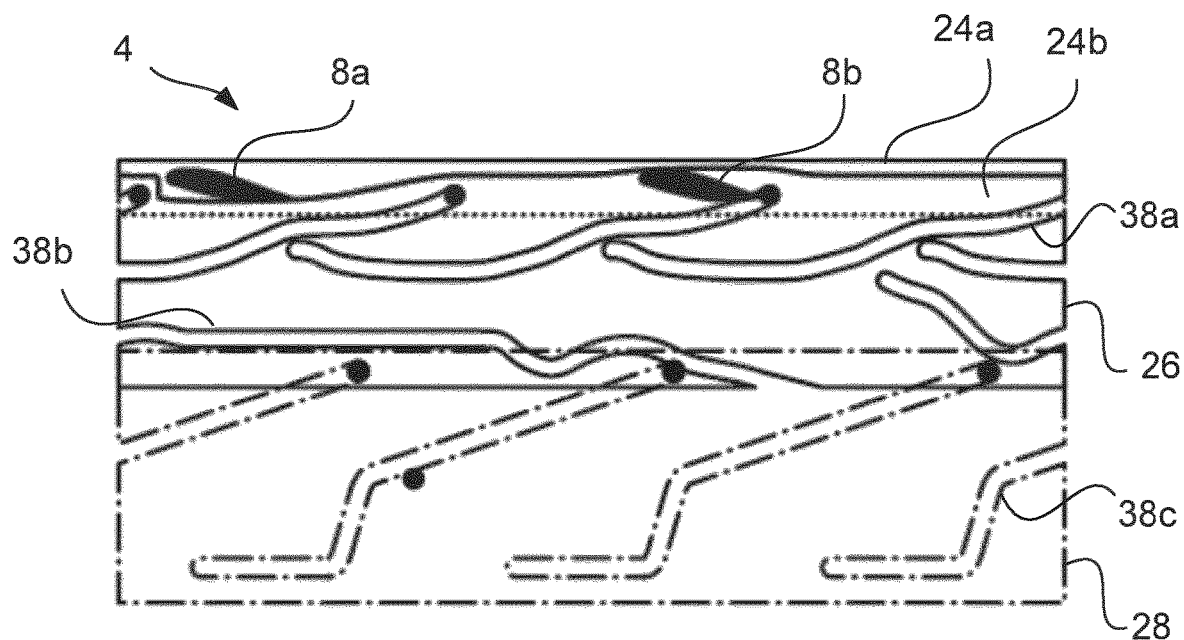
FIGS. 7a-7d illustrate the different guide paths arranged in the propeller shown in FIGS. 6a-6c, which paths guide the propeller blades between the storage position and the operational position.
Figure 7B:
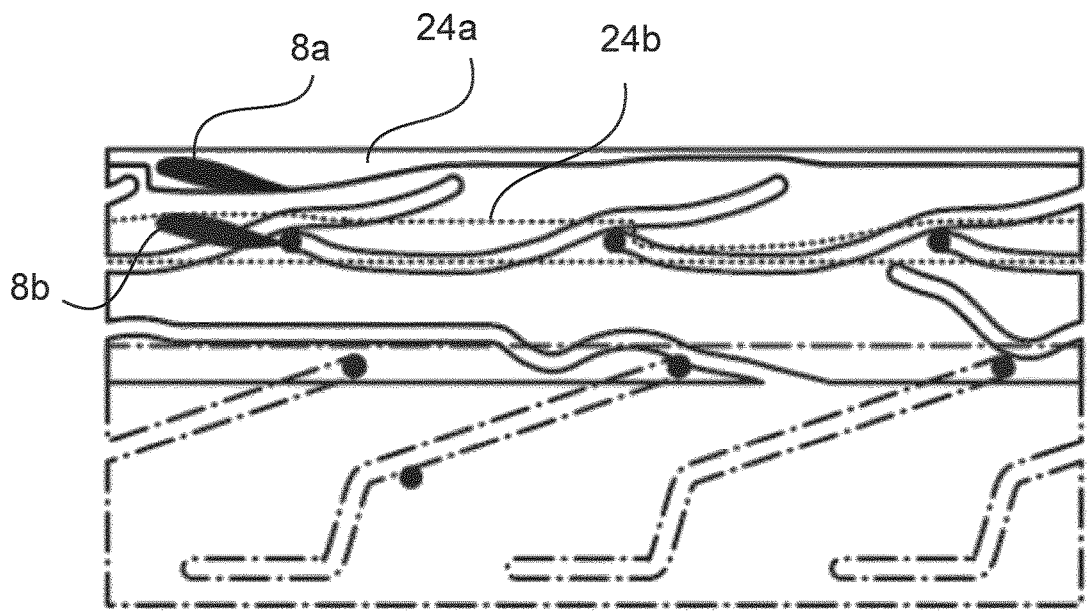
Figure 7C:
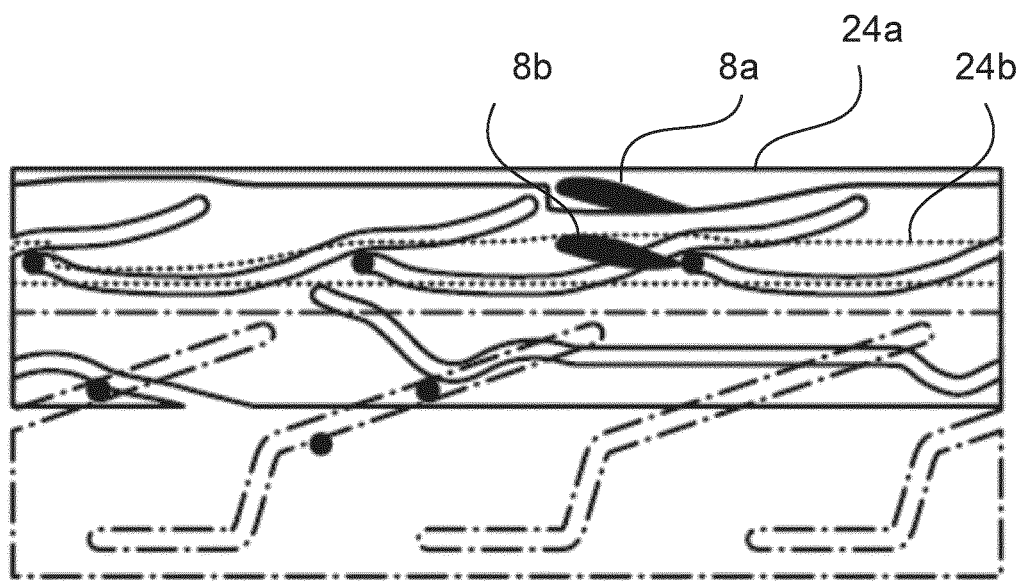
Figure 7D:
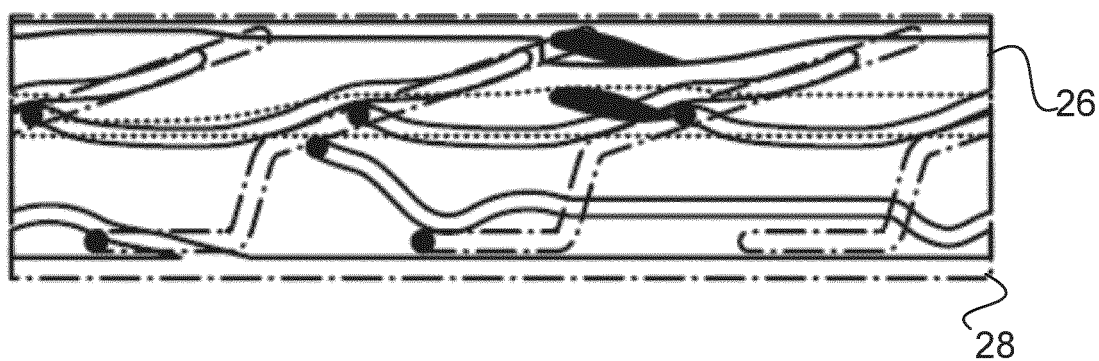

FIGS. 7a-7d illustrate the different guide paths 38a-38c arranged in the propeller shown in FIGS. 6a-6c, which guide paths 38a-38c guide the propeller 4 between the operational position and the storage position. Each FIG. 7a-7b represents the propeller 4 and the guide paths 38a-38c in a 360° unfolded view. In FIG. 7a the propeller 4 is in the operational position. The propeller blades 8a and 8b are arranged at 180° from each other. In FIG. 7b the second propeller blade 8b and the second sleeve member 24b has rotated 180° in relation to the first propeller blade 8a and the first sleeve member 24a. In FIG. 7c both propeller blades 8a, 8b and the first and second sleeve members 24a, 24b have rotated to the storage position. In FIG. 7d the first cylindrical element 26 has slided downwards on the second cylindrical element 28.

FIGS. 8a and 8b schematically illustrate the propeller 4 in the operational position and the storage position provided with a locking mechanism 46 according to an example. The locking mechanism 46 is configured to selectively lock each sleeve member 24a, 24b in the operational position of the propeller blades 8a, 8b. The at least one locking mechanism 46 may lock at least two sleeve members 24a, 24b to each other.

The foregoing description of the preferred embodiments of the present invention is provided for illustrative and descriptive purposes. It is not intended to be exhaustive or to restrict the invention to the variants described. Many modifications and variations will obviously be apparent to one skilled in the art. The embodiments have been chosen and described in order best to explain the principles of the invention and its practical applications and hence make it possible for specialists to understand the invention for various examples and with the various modifications appropriate to the intended use.

The invention claimed is:

1. A propeller for an aircraft, wherein the propeller comprises at least two blades, arranged about a central hub, the central hub being coupled to at least one motor, driven by a power source,
   wherein at least one blade of the at least two blades is attached to at least one sleeve member, configured for being in an outer sliding connection to a first cylindrical element of the hub,
   wherein an inner surface of each of said at least one sleeve member comprises at least one projecting element, configured to be in a sliding connection with a corresponding at least one first recessed guide path, arranged in an outer surface of the first cylindrical element,
   wherein each of said at least one first recessed guide path circles at least partly around the first cylindrical element from a first position to a second position,
   wherein each of said at least one sleeve member positions its blade in an operational position when its at least one projecting element is positioned in its corresponding first position in its designated first recessed guide path of the first cylindrical element,
   wherein each of said at least one sleeve member positions its blade in a storage position when its at least one projecting element is positioned in its corresponding second position in its designated first recessed guide path of the first cylindrical element,
   wherein a rotation of the first cylindrical element moves each of said at least one sleeve member thereabout along their first recessed guide path,
   wherein the hub is operated by a second cylindrical element, the second cylindrical element being coupled to the at least one motor,
   wherein the second cylindrical element further comprises at least one third recessed guide path, arranged in an outer surface of the second cylindrical element,
   wherein an inner surface of the first cylindrical element comprises at least one projecting element, configured to be in a sliding connection with the corresponding at least one third recessed guide path, arranged in the outer surface of the second cylindrical element, and
   wherein a rotation of the second cylindrical element transfers said rotation and moves the first cylindrical element along a length of the at least one third recessed guide path.

2. The propeller according to claim 1, wherein the storage positions of each of said at least one blade is/are aligned at the same angular position in a radial direction from the first cylindrical element.

3. The propeller according to claim 1, wherein the at least one blade is fixedly attached to the first cylindrical element at the same angular position as a corresponding storage position thereof.

4. The propeller according to claim 1, wherein a second recessed guide path having a second position being arranged lower at the first cylindrical element than the at least one first recessed guide path, has a longer path length between its first and second position, compared to the at least one first adjacent recessed guide path.

5. The propeller according to claim 4, wherein the second recessed guide path having a second position being arranged lower at the first cylindrical element than the at least one first recessed guide path, has a lower accumulated/overall path angle between its first and second position, compared to the at least one first recessed guide path.

6. The propeller according to claim 1, wherein each sleeve member comprises a first end section being flat, and second end section that comprises at least one high point and at least one low point, compared to an average of an height of the second end section, wherein the sleeve members are arranged on the first cylindrical element so that second end sections of adjacent sleeve members face each other.

7. The propeller according to claim 1, wherein a rotation of the second cylindrical element in a direction corresponding to the propeller moving forward for generating thrust, biases at least one propeller blade to move from its storage position towards its operational position by means of rotation of its sleeve member about the first cylindrical element.

8. The propeller according to claim 1, further comprising at least one locking mechanism, configured to selectively lock each sleeve member in the operational position of the blades.

9. The propeller according to claim 1, wherein said propeller comprises two blades.

10. The propeller according to claim 1, wherein said propeller comprises four blades.

11. Arrangement comprising a propeller according to claim 1, wherein the arrangement further comprises a compartment configured to accommodate the propeller.

12. A propeller for an aircraft, wherein the propeller comprises at least two blades, arranged about a central hub, the central hub being coupled to at least one motor, driven by a power source,
    wherein at least one blade is attached to at least one sleeve member, configured for being in an outer sliding connection to a first cylindrical element of the hub,
    wherein an inner surface of each of said at least one sleeve member comprises at least one projecting element, configured to be in a sliding connection with a corresponding at least one first recessed guide path, arranged in an outer surface of the first cylindrical element,
    wherein each of said at least one first recessed guide path circles at least partly around the first cylindrical element from a first position to a second position,
    wherein each of said at least one sleeve member positions its blade in an operational position when its at least one projecting element is positioned in its corresponding first position in its designated first recessed guide path of the first cylindrical element,
    wherein each of said at least one sleeve member positions its blade in a storage position when its at least one projecting element is positioned in its corresponding second position in its designated first recessed guide path of the first cylindrical element,
    wherein a rotation of the first cylindrical element moves each of said at least one sleeve member thereabout along their first recessed guide path,
    wherein the storage positions of each of said at least one blade is/are aligned at the same angular position in a radial direction from the first cylindrical element,
    wherein a blade is fixedly attached to the first cylindrical element at the same angular position as a corresponding storage position thereof,
    wherein the hub is operated by a second cylindrical element, the second cylindrical element being coupled to the at least one motor,
    wherein the second cylindrical element further comprises at least one third recessed guide path, arranged in an outer surface of the second cylindrical element,
    wherein an inner surface of the first cylindrical element comprises at least one projecting element, configured to be in a sliding connection with the corresponding at least one third recessed guide path, arranged in the outer surface of the second cylindrical element, and
    wherein a rotation of the second cylindrical element transfers said rotation and moves the first cylindrical element along a length of the at least one third recessed guide path.

13. The propeller according to claim 12, wherein a second recessed guide path having a second position being arranged lower at the first cylindrical element than the at least one first recessed guide path, has a longer path length between its first and second position, compared to the at least one first adjacent recessed guide path.

14. An aircraft, comprising at least one wing, wherein the aircraft comprises at least one propeller, wherein the propeller comprises at least two blades, arranged about a central hub, the central hub being coupled to at least one motor, driven by a power source,
    wherein at least one blade is attached to at least one sleeve member, configured for being in an outer sliding connection to a first cylindrical element of the hub,
    wherein an inner surface of each of said at least one sleeve member comprises at least one projecting element, configured to be in a sliding connection with a corresponding at least one first recessed guide path, arranged in an outer surface of the first cylindrical element,
    wherein each of said at least one first recessed guide path circles at least partly around the first cylindrical element from a first position to a second position,
    wherein each of said at least one sleeve member positions its blade in an operational position when its at least one projecting element is positioned in its corresponding first position in its designated first recessed guide path of the first cylindrical element,
    wherein each of said at least one sleeve member positions its blade in a storage position when its at least one projecting element is positioned in its corresponding second position in its designated first recessed guide path of the first cylindrical element,
    wherein a rotation of the first cylindrical element moves each of said at least one sleeve member thereabout along their first recessed guide path,
    wherein the hub is operated by a second cylindrical element, the second cylindrical element being coupled to the at least one motor,
    wherein the second cylindrical element further comprises at least one third recessed guide path, arranged in an outer surface of the second cylindrical element,
    wherein an inner surface of the first cylindrical element comprises at least one projecting element, configured to be in a sliding connection with the corresponding at least one third recessed guide path, arranged in the outer surface of the second cylindrical element, and
    wherein a rotation of the second cylindrical element transfers said rotation and moves the first cylindrical element along a length of the at least one third recessed guide path.

15. The aircraft according to claim 14, wherein the aircraft comprises a compartment for accommodation of the at least one propeller.

16. An aircraft, comprising at least one wing, wherein the aircraft comprises at least one propeller, wherein the propeller comprises at least two blades, arranged about a central hub, the central hub being coupled to at least one motor, driven by a power source,
    wherein at least one blade is attached to at least one sleeve member, configured for being in an outer sliding connection to a first cylindrical element of the hub,
    wherein an inner surface of each of said at least one sleeve member comprises at least one projecting element, configured to be in a sliding connection with a corresponding at least one first recessed guide path, arranged in an outer surface of the first cylindrical element, wherein each of said at least one first recessed guide path circles at least partly around the first cylindrical element from a first position to a second position, wherein each of said at least one sleeve member positions its blade in an operational position when its at least one projecting element is positioned in its corresponding first position in its designated first recessed guide path of the first cylindrical element, wherein each of said at least one sleeve member positions its blade in a storage position when its at least one projecting element is positioned in its corresponding second position in its designated first recessed guide path of the first cylindrical element, wherein a rotation of the first cylindrical element moves each of said at least one sleeve member thereabout along their first recessed guide path, wherein the storage positions of each of said at least one blade is/are aligned at the same angular position in a radial direction from the first cylindrical element, wherein a blade is fixedly attached to the first cylindrical element at the same angular position as a corresponding storage position thereof, wherein the hub is operated by a second cylindrical element, the second cylindrical element being coupled to the at least one motor, wherein the second cylindrical element further comprises at least one third recessed guide path, arranged in an outer surface of the second cylindrical element, wherein an inner surface of the first cylindrical element comprises at least one projecting element, configured to be in a sliding connection with the corresponding at least one third recessed guide path, arranged in the outer surface of the second cylindrical element, and wherein a rotation of the second cylindrical element transfers said rotation and moves the first cylindrical element along a length of the at least one third recessed guide path..

17. An aircraft according to claim 16, wherein a second recessed guide path having a second position being arranged lower at the first cylindrical element than the at least one first recessed guide path, has a longer path length between its first and second position, compared to the at least one first adjacent recessed guide path.

* * * * *